(12) United States Patent
Noorhosseini et al.

(10) Patent No.: US 6,707,795 B1
(45) Date of Patent: Mar. 16, 2004

(54) ALARM CORRELATION METHOD AND SYSTEM

(75) Inventors: Majid Noorhosseini, Nepean (CA); Lyle F. Zary, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/298,832

(22) Filed: Apr. 26, 1999

(51) Int. Cl.$^7$ ............................................. H04L 12/26
(52) U.S. Cl. ..................................... 370/242; 714/796
(58) Field of Search ............................... 370/242, 243, 370/244, 245, 246, 248; 702/127, 182, 183, 185; 714/25, 26, 37, 39, 48, 796, 799

(56) References Cited

U.S. PATENT DOCUMENTS

| | | | |
|---|---|---|---|
| 5,295,244 A | * 3/1994 | Dev et al. | 345/853 |
| 5,309,448 A | 5/1994 | Bouloutas et al. | 371/29.1 |
| 5,428,619 A | * 6/1995 | Schwartz et al. | 706/916 |
| 5,483,637 A | 1/1996 | Winokur et al. | 395/183.02 |
| 5,495,470 A | 2/1996 | Tyburski et al. | 370/14 |
| 5,596,712 A | * 1/1997 | Tsuyama et al. | 714/26 |
| 5,646,864 A | 7/1997 | Whitney | 364/514 |
| 5,748,098 A | * 5/1998 | Grace | 340/3.41 |
| 5,768,501 A | 6/1998 | Lewis | 395/185.01 |
| 5,771,274 A | 6/1998 | Harris | 379/26 |
| 5,949,759 A | * 9/1999 | Cretegny et al. | 370/249 |
| 6,012,152 A | * 1/2000 | Douik et al. | 714/26 |
| 6,249,755 B1 | * 6/2001 | Yemini et al. | 702/181 |
| 6,253,339 B1 | * 6/2001 | Tse et al. | 714/47 |
| 6,393,386 B1 | * 5/2002 | Zager et al. | 703/25 |

OTHER PUBLICATIONS

"Using Network Node Manager HP Openview Edition 1". Hewlett Packard. Apr. 1997. pp. 231–239.*
Jakoboson and Weissman. "Alarm Correlation: Correlating multiple network alarms improves telecommunications network surveillance and fault management". IEEE Network. Nov. 1992. pp. 52–59.*
Keffer et al. "An Artifical Intelligence Approach to Network Fault Management". Sprint Corporation. Jan. 8, 1996. pp. 1–10.*

* cited by examiner

Primary Examiner—Chi Pham
Assistant Examiner—Derrick W Ferris (57) ABSTRACT

An alarm correlation method for use in a network management device is provided in which alarm correlation is performed between identified root-cause alarms and alarms which have been raised on network elements satisfying particular relationships with the network element that raised the root-cause alarm. A hierarchical network model is provided consisting of a transport termination point for each connection at various layers terminated by each network element, and a connectivity model is maintained which identifies all connections in the network. An impact group of transport termination points for a given transport termination point defines where to look for alarms for correlation for a given root-cause alarm. Preferably, a link between the root-cause alarm and a transport termination point which has been examined is established which allows expeditious correlation of later received symptomatic alarms with the root-cause alarm.

18 Claims, 7 Drawing Sheets

ALARM CORRELATION METHOD AND SYSTEM

FIELD OF THE INVENTION

The invention relates generally to the processing and management of alarms in communications networks, and more particularly to an alarm correlation method and system.

BACKGROUND OF THE INVENTION

Any large telecommunications network is subject to occasional and/or frequent faults which result in alarms being raised. Finding the original cause of a particular fault can be an arduous task. Naturally, the time spent finding and fixing a fault depends on how the alarms occur and also on the level of experience of an assigned operator. If the fault is particularly complex then the resulting time loss can be significant.

In order to quickly diagnose a problem that occurs in a network, a network operator must be knowledgeable with respect to alarm reporting mechanisms, network element operations, and connection and configuration dependencies.

Even if the operator is experienced with the above, some difficulty in analysing network faults will still exist due to the manner by which alarms are reported in the network. For example, alarm flooding may occur in which case one fault causes many alarms to occur at once which can suddenly overwhelm the network operator. The network operator has to manually filter the alarm flooding-reports to find the direct failure alarm that is hidden in the alarm flood. In another example, referred to as Alarm Toggling (Alarm Streaming), alarms are constantly raising and clearing because of an intermittent fault. Related alarms to the fault can also toggle, and such alarm toggling may become confusing to the network operator. As an example, if the alarms are rapidly toggling (e.g. raising and clearing every second) the operator may have to take a snap-shot of the alarms at an instance in time to understand what may be happening in the network. If alarms are slowly toggling (e.g. raising and clearing every 5 minutes), the operator may miss a diagnosis if the alarm is currently in a clear state.

The biggest problem in network diagnosis deals with the time involved to locate a fault's point of origin in the network. If. the network operator can quickly locate a failure, services can be restored quicker and chances are reduced that a small failure will develop into a bigger network problem.

In order to help the network operator view faults in a network, root-cause analysis systems have been developed. Some such systems may show an alarm correlation by presenting alarms that have been correlated into groups consisting of a direct detected alarm together with symptomatic alarm messages. This correlation greatly reduces the amount of time that the network operator has to spend in manually filtering the alarm messages. In addition, such systems may provide the customer with a view of problems found in the network. This will shift the network operator's attention from viewing alarms to viewing problems in the network. Furthermore, some such systems are capable of providing a brief probable cause description of the problem and providing a reference that can be used to help identify the problem.

The correlation methods used in existing tools rely on an exhaustive search of the network to find symptomatic alarms for the root-cause alarm. This means that every alarm on every network element in the network is examined in order for correlation. This is very expensive in terms of computing power and execution time. To overcome this problem, such methods have limited themselves to certain types of alarms. From a flood of alarms, they select a certain type of alarms, reject the rest, and perform the exhaustive search for alarms of the selected type only. The selected alarms are usually the alarms raised at the line layer and these typically constitute roughly 20% of the total alarms. Although these limited correlation capabilities are practical for small networks, applying them would not be practical for larger more complicated networks.

SUMMARY OF THE INVENTION

It is an object of the invention to obviate or mitigate one or more of the above identified disadvantages.

The invention is composed of two elements, namely a network modelling scheme and a correlation process. The network modelling scheme models a set of network elements in a network as a hierarchy of TTPs (transport termination points) and creates several layers of connected TTPs. In the new correlation process, the network of connected TTPs is traversed once a root-cause alarm is raised and a problem object is created. A traversed TTP keeps its association with the problem object. In this manner a symptomatic alarm raised on the TTP is correlated with the associated problem(s) without the need for a repeated search of the network.

More specifically, in the new network modelling scheme provided by the invention, a network element is modelled as a hierarchy of virtual server-client TTPs. A TTP at a lower layer is served by a TTP at a higher layer. The whole network is then modelled by establishing connections between these TTPs. Since the TTPs are arranged in a hierarchy, the whole network will conform to a hierarchy. The connectivity of TTPs at the highest layer models the connectivity of network elements themselves. The connectivity of TTPs at lower layers represents the network at various topology/termination layers (e.g. optical, section, line, path, etc.). A network at a lower layer is served by a network at the higher layer. The alarms in the new model are considered to be raised on TTPs and not on network elements.

The correlation process is devised in harmony with the network modelling scheme. The correlation process determines a new alarm to be either a root-cause alarm or a symptomatic alarm. If it is a root-cause alarm then it is associated with a problem object with a generic attribute called correlation state. The correlation state of the problem is used to correlate symptomatic alarms to the problem. Once a problem (and hence the correlation state) is created on a TTP at a certain layer, the directly connected TTPs at the same layer and all the client TTPs at the lower layers served by the problem's TTP are traversed in search of correlatable symptomatic alarms. On each traversal the symptomatic alarms on the TTPs are examined by an inference engine and added to the problem if correlatable. More generally, all the alarms on TTPs which satisfy certain predetermined criteria are considered for correlation. Any TTP traversed will keep its association with the correlation state. Therefore when a symptomatic alarm arrives later on that TTP, it is readily examined against any associated correlation state(s). This method of correlation alleviates the need for searching the network every time an alarm arrives. It greatly reduces the processing time of correlation since the majority of alarms are of symptomatic types and traversing of the network is only performed upon arrival of a root-cause alarm.

The correlation method presented here is technology independent and allows the correlation of alarms at all layers of the network with a significantly improved performance.

Using this method, the number of alarms considered for correlation is significantly increased due to participation of all the layers in the correlation process. The performance of the correlation process is also improved dramatically by eliminating the need for searching the network for a root-cause alarm when a symptomatic alarm is raised.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
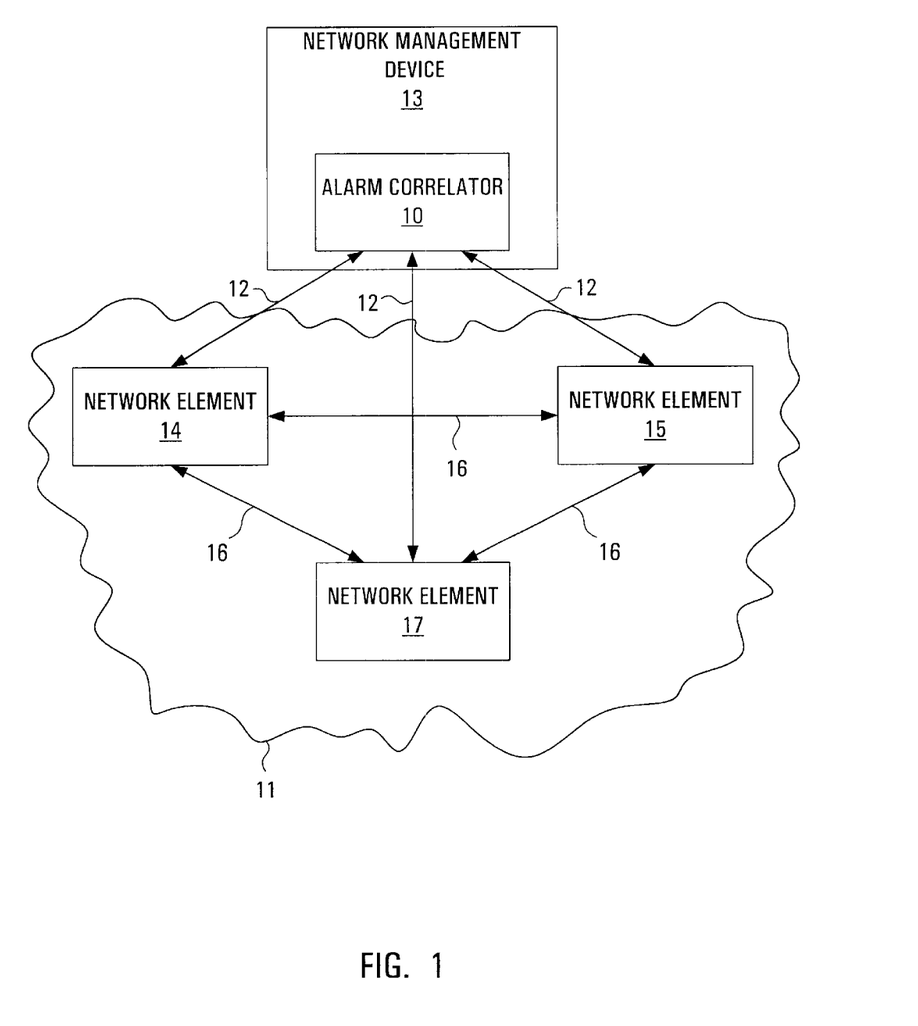
FIG. 1 is a block diagram of a network to be managed and a network management device including an alarm correlator according to an embodiment of the invention.

Referring to FIG. 1, an alarm correlator according to an embodiment of the invention is indicated at 10. In a preferred implementation, the alarm correlator forms part of a NMD (network management device) such as generally indicated by 13. The alarm correlator 10 (or the NMD 13) is connected to a network which is generally indicated by 11 through one or more network management links 12. In the illustrated example the network 11 consists of three network elements 14,15,17 connected to each other through links 16. The alarm correlator 10 is shown connected to each of the network elements 14,15,17 through a respective network management link 12, but this need not be the case in general. Through the network management links 12 or through any other appropriate input, the alarm correlator 10 receives all alarm messages generated by the network elements 14,15, 17.

Figure 2:
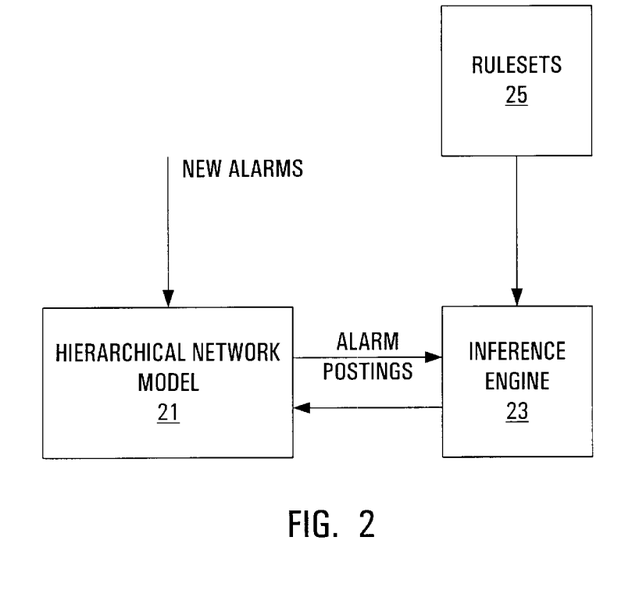
FIG. 2 is a logical block diagram of the alarm correlator of FIG. 1.
Figure 3:
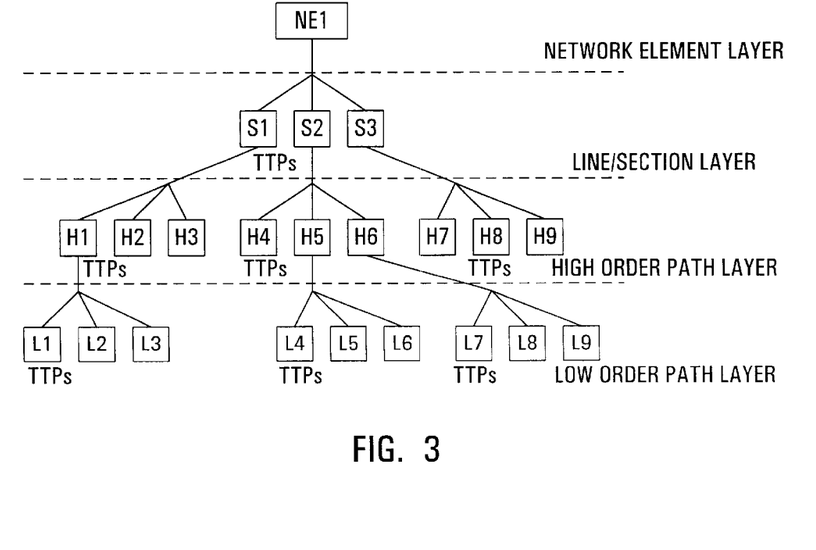
FIG. 3 is an example of a hierarchical network model according to an embodiment of the invention.

A functional block diagram for the alarm correlator 10 of FIG. 1 is shown in FIG. 2. There are two main blocks, namely a hierarchical network model 21, and an inference engine 23. The hierarchical network model 21 is a model of a network being managed, for example the network 11 of FIG. 1, which is designed specifically for alarm correlation. The hierarchical network model 21 receives new alarms from the network or from the network management device 13 and forwards alarm postings to the inference engine 23. The inference engine 23 processes the alarm postings and may send messages to the hierarchical network model 21. Also shown in FIG. 3 is an optional rule sets block 25 consisting of one or more rule sets which are then taken into account by the inference engine 23 when processing alarm postings. As will be described in detail below, the intelligence of the alarm correlator 10 is distributed across both the hierarchical network model 21 and the inference engine 23.

To begin, as part of the hierarchical network model 21, a logical hierarchical model of each network element is generated and maintained. Each network element is modelled as a hierarchy of virtual server-client TTPs (transport termination points). TTPs are the terminals on a network element which terminate a signal, and these signals are at different rates and hence different layers. One network element usually terminates many signals, not one. For example an OC48 network element may terminate 48 signals at the DS1 level, or 4 signals at OC12 layers, or 12 signals at the OC3 level or a combination of these. Therefore on such a network element there would be up to 48 TTPs at the DS3 layer, up to 4 TTPS at the OC12 layer, and so on. A TTP at a lower layer is served by a TTP at a higher layer. This can be better described with reference to the example in FIG. 3 which is a graphical representation of an example logical hierarchial model for a single network element. The top layer of the hierarchy is a block labelled NE1 representing a network element per se. This network element might be an ATM switch for example.

The next layer of the hierarchy consists of TTPs served by the higher layer TTP. In this case, the next layer will consist of TTPs for each line/section card forming part of the network element NE1. In the illustrated example, there are three line/section layer TTPs labelled S1,S2,S3.

The next layer of the hierarchical model consists of a model of high order paths. A TTP is included for each high order path terminated by a given line/section. In the illustrated example, S1 is shown serving TTPs H1,H2,H3, S2 is shown serving H4,H5,H6, and S3 is shown serving H7,H8, H9.

The last layer of the hierarchical model consists of a model of low order paths. A TTP is included in this layer for each low order path terminated by a given high order path. In the illustrated example, H1 is shown serving TTPs L1,L2,L3, H5 is shown serving L4,L5,L6, and H6 is shown serving L7,L8, and L9.

As an example, on a OC192 NE, there are two TTPS at the OC192 signal rate, and each of these might serve 4 TTPs at the OC48 rate which in turn might serve 4 OC12 TTPs, which each might serve 4 TTPS at the OC3 rate which in turn each might serve 3 TTPs at DS1 rate. This is just an example which applies to SONET. The signal division is different but similar in an SDH or ATM domain.

This hierarchical model can be stored in any convenient manner. For example it may be stored in the form of a linked list, with a top layer entry for each network element, and then with links to lower layer TTPs and so on.

In the illustrated example, the hierarchical model Ad includes four layers. However, it is to be understood that the invention can be applied with a fewer or greater number of layers.

The above described hierarchical model of the network elements is used to develop a connectivity model of the entire network and more particularly to develop a different connectivity model for each layer in the model. An example of such a connectivity model is given in FIG. 4. This model might correspond with the example physical network of FIG. 1. In this example, the hierarchical model for each of three network elements is shown, with the model for the first network element 14 generally indicated by 20, the model for the second network element 16 generally indicated by 22, and the model for the third network element 17 generally indicated by 24. In the illustrated example, the section layer includes TTPs S1,S2,S3 served by NE1, S4,S5,S6 served by NE2, and S7,S8,S9 served by NE3. The high order path layer includes TTPs H1,H2, H3 served by S3, H4,H5,H6 served by S4, H7,H8,H9 served by S5, and H10,H11,H12 served by S7. Finally, the low order path layer includes TTPs L1,L2,L3 served by H3, L4,L5,L6 served by H4, and L7,L8,L9 served by H10.

Figure 4:
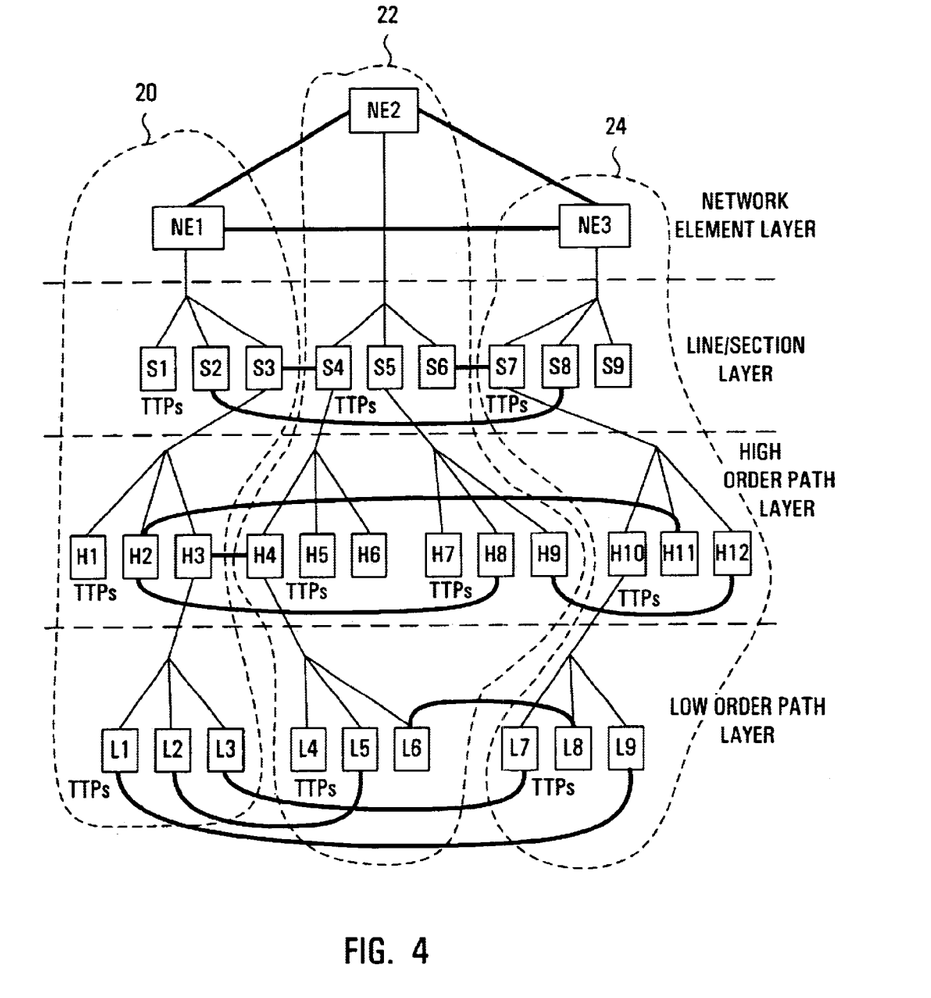
FIG. 4 is another example of a hierarchical network model which shows connections between transport termination points.

The connectivity model for a given layer of the model includes connections between TTPs within that layer. The top level connectivity model of the network is maintained by identifying physical connections between network elements and mapping these to connections between associated TTPs. In the physical model of FIG. 1, network element 14 is connected to network elements 15,17 so NE1 representative of network element 14 is shown connected to NE2,NE3 which are representative of network elements 15,17 respectively. A i similar connectivity model is maintained for lower layers. Connections are shown between pairs of TTPs in the line/section layer, pairs of TTPs in the high order path layer, and pairs of TTPs in the low order path layer. These connections are illustrated graphically by lines connecting the TTPs representing the network elements. The graphical representation of FIG. 4 is convenient for the purpose of understanding. However, the information can easily be stored in any convenient format, for example using a linked list format or a tabular format which captures both the hierarchical models of the network elements and the connectivity models. For the illustrated example, the top layer model may consist of a table of the form shown in Table 1 below.

Any mechanism capable of capturing both a system's hierarchy and its connectivity may be used, such a system generally being referred to as a hierarchical connectivity model.

TABLE 1

| NE | Pointers to Connected NEs | Pointers to Served TTPs | Alarms and Links to correlation States |
|---|---|---|---|
| NE1 | NE2, NE3 | S1, S2, S3 | |
| NE2 | NE1, NE3 | S4, S5, S6 | |
| NE3 | NE1, NE2 | S7, S8, S9 | |

The table includes a row for each network element in the network element layer. Thus, there is a row for each of the three network elements labelled NE1, NE2, and NE3. Next, there is a column labelled "Pointers to Connected NEs" which lists the NEs directly connected to the network element identified in the first column (or pointers to these NEs). The next column is entitled "Pointers to Served TTPs", and includes an identification of (or a pointer to) any TTPs in a next lower layer which are directly served by the network element identified in the first column. For example, since S1, S2, and S3 are served by NE1, these are identified as served TTPs in the table. Each row in the table can be an object if an object oriented approach is employed. Also shown is a column entitled "Alarms and Pointers to Correlation States" which is simply representative of memory allocated in each record to store alarms raised on that network element, and to store pointers to correlation states, as described in further detail below.

The connectivity model for the line/section TTPs can be summarized by Table 2 below which is similar to Table 1 except that each record is for a TTP rather than an NE, and pointers in the second column are to connected TTPs rather than connected NEs.

TABLE 2

| TTP | Pointers to Connected TTPs | Pointers to Served TTPs | Alarms and Links to Correlation States |
|---|---|---|---|
| S1 | | | |
| S2 | S8 | | |
| S3 | S4 | | H1, H2, H3 |
| S4 | S3 | | H4, H5, H6 |
| S5 | | | H7, H8, H9 |
| S6 | S7 | | |
| S7 | S6 | | H10, H11, H12 |
| S8 | S2 | | |
| S9 | | | |

The connectivity model for the high order path layer TTPs can be summarized by Table 3 below.

TABLE 3

| TTP | Pointers to Connected TTPs | Pointers to Served TTPs | Alarms and Links to Correlation States |
|---|---|---|---|
| H1 | | | |
| H2 | H8, H1 | | |
| H3 | H4 | L1, L2, L3 | |
| H4 | H3 | L4, L5, L6 | |
| H5 | | | |
| H6 | | | |
| H7 | | | |
| H8 | H2 | | |
| H9 | H12 | L7, L8, L9 | |
| H10 | | L7, L8, L9 | |
| H11 | H2 | | |
| H12 | H9 | | |

Finally, the connectivity model for the low order path layer TTPs can be summarized by Table 4 below.

TABLE 4

| TTP | Pointers to Connected TTPs | Pointers to Served TTPs | Alarms and Links to Correlation States |
|---|---|---|---|
| L1 | L9 | | |
| L2 | L5 | | |
| L3 | L7 | | |
| L4 | | | |
| L5 | L2 | | |
| L6 | L8 | | |
| L7 | L3 | | |
| L8 | L6 | | |
| L9 | L1 | | |

The above tables completely summarize the connectivity of the network at all layers. These tables need to be dynamically maintained such that new links to TTPs are added as connections are newly generated. Existing network management devices include self discovery features which allow them to be constantly aware of the state of the network and these can be used to keep the connectivity model accurate.

The alarm correlator 10 has a "root-cause determiner", this being either information or capabilities, for example a list of one or more constraints which allow it to make a determination of whether a given alarm is a root-cause alarm or a symptomatic alarm. This may simply consist of a list of alarm types which are root-cause alarms for example.

The alarm correlator 10 has the capability to generate and manage a set of problem objects. Each problem has a root-cause alarm and a list of symptomatic alarms which have been correlated with the root-cause alarm. A problem object is created upon identification of a root-cause alarm. Problem objects, once created and filled in as described below, are forwarded to a network management GUI for consideration by network management and troubleshooting personal. The problem object has a structure which consists of a header containing all the information necessary to uniquely identify a problem object and a list of correlated alarms. For example it might have the following structure:

Problem Header—includes Problem Identifier, Root-cause Alarm, Problem Reason, Network Element Identifier, acknowledgment information, and any other information needed to complete a problem objects identity.

CorrelatedAlarmList—a list of all correlated alarms.

A correlation state is an object which is created together with a problem object upon the identification of a root-cause alarm which can be passed around to different TTPs to correlate their alarms. A correlation state preferably has the following structure the purpose of which will be described in detail below:

StateText—a string that is used by the inference engine 23 to correlate alarms. It is assigned by the inference engine 23 when the correlation state is created and it typically is text from the root-cause alarm.

OriginalTTP—a pointer to the original TTP on which the correlation state's root-cause alarm was raised.

CurrentTTP—a pointer to the current TTP which is posting the correlation state to the engine.

Impact—an attribute which indicates whether the CurrentTTP is the OriginalTTP or is an Impact TTP. Possible values are Internal and External.

RootCauseAlarm—a pointer to the root-cause alarm.

ExpectedAlarmList—a list of expected correlated symptomatic alarms for the current TTP.

Problem—a pointer to its correlated problem object.

Figure 5:
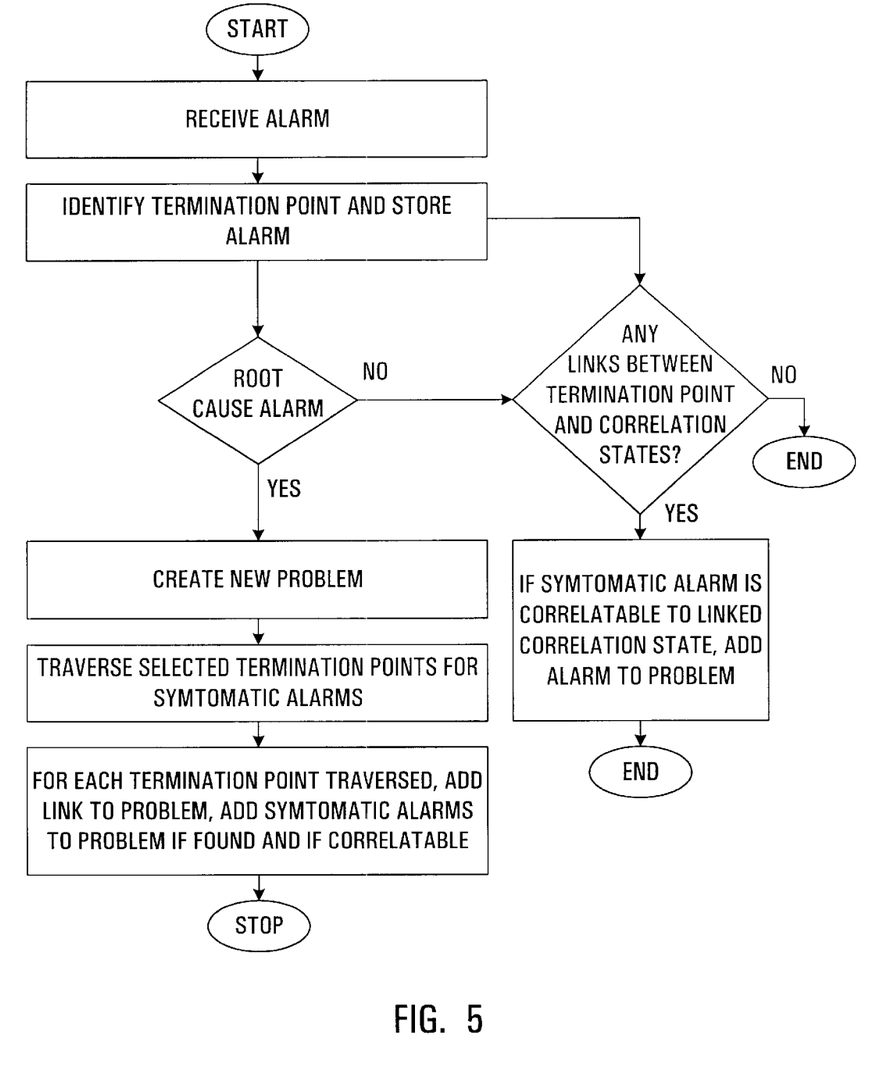
FIG. 5 is a flowchart for the processing of alarms by the inference engine of FIG. 2.

The steps performed by the alarm correlator 10 each time it receives a new alarm through one of the network management links 12 will be described with reference to the flowchart of FIG. 5.

To begin, the alarm is examined and an association with one of the TTPs is identified. Each alarm record contains some detail information, including for example the network element identifier of the network element which raised the alarm, the shelf location, the slot and subslot location, the signal rate of the network element, etc. All the information needed to associate an alarm with a particular TTP is part of the alarm record and is used to allocate an alarm to a TTP. This alarm is then stored in memory in association with the TTP thus identified, for example as part of the TTP object.

The alarm is then posted to the inference engine for a determination of whether the alarm is a root-cause alarm or not. In the event that the alarm is a root-cause alarm, the inference engine creates a new problem object for that alarm in association with the TTP which raised it. A correlation state object as described above is created at the same time. The correlation state indeed represents the collective states of a group of interrelated objects which might have an impact on each other. The raising of a root-cause alarm causes the inference engine to generate a correlation state on the TTP which posted the alarm.

The StateText forming part of the correlation state which is typically the root-cause alarm text is used by the inference engine to correlate symptomatic alarms with the root-cause alarm during traversal as detailed below.

Next, the correlation state object traverses all the TTPs which could possibly be related to the problem. This group of TTP's is referred to as the "impact group" of TTP's. The impact group is determined by examining the physical and logical connectivity of network elements as defined in the hierarchial network model and the connectivity model. This impact group can be defined in several ways. Preferably it includes the TTPs directly connected to the problem's TTP in the same model layer. The impact group also includes all TTPs served by the problem's TTP. This may include TTPs in multiple layers below the problem's TTP. Finally, the impact group also includes all TTPs directly connected to TTPs served by the problem's TTP. More specifically, after the correlation state is generated it is consecutively passed on to the TTPs in the impact group. It is first passed to TTP objects in the same layer and then to lower layer TTPs. Each TTP object modifies the CurrentTTP and Impact attributes of the correlation state accordingly, and posts the correlation state to the inference engine. More specifically, the CurrentTTP field is filled in to point at the TTP which is currently posting the correlation state, the "Impact" is set to "External" if the TTP is not the original TTP, and is set to "Internal" if the CurrentTTP is the original TTP. The CurrentTTP contains all the information about the layer, rate and other equipment related data required for the correlation.

At each traversed TTP, the correlation state does two things. Firstly, it determines if the TTP has any symptomatic alarms correlatable to the root-cause alarm. If it does, then these symptomatic alarms are added to the problem. When the inference engine receives a correlation state from a TTP, it determines the expected alarms on the TTP based on the StateText, CurrentTTP and Impact attributes of the correlation state and passes these to the TTP in the ExpectedAlarmList parameter of the correlation state. The TTP then examines its alarm list and adds any alarms found which are expected alarms to the associated problem object. Once the circulation of the correlation state is complete, this associated problem object is reported to interested clients. There might still be some outstanding expected alarms. Whenever they are raised at a later time, they will be added to the problem object.

Secondly, in the process of TTP traversal, a link is established between the TTP and the correlation state. This may simply be a pointer to the correlation state, for example. The link may also include a list of expected alarms which have not yet been raised on the TTP. Preferably links are only established in the event that a given TTP has expected alarms which have not yet been received on the TTP.

In the event the alarm is not a root-cause alarm, the alarm is first stored as a symptomatic alarm in association with the TTP which raised it for possible future association with root-cause alarms which have yet to be raised. In addition, the TTP is examined to determine if there has been one or more previously established links between that TTP and respective correlation states. If there are, then these correlation states are examined for possible correlation with the symptomatic alarm, and the symptomatic alarm is added to the associated problem object(s) if appropriate. If an expected alarm list has been stored by the TTP then a very rapid correlation can be performed by simply determining if the symptomatic alarm is part of this list.

The new correlation model presents a new way of interacting among the objects in the hierarchial network model structure and the inference engine. In this model objects control the flow if information and as a result fewer queries are posted to the engine.

Figure 6:
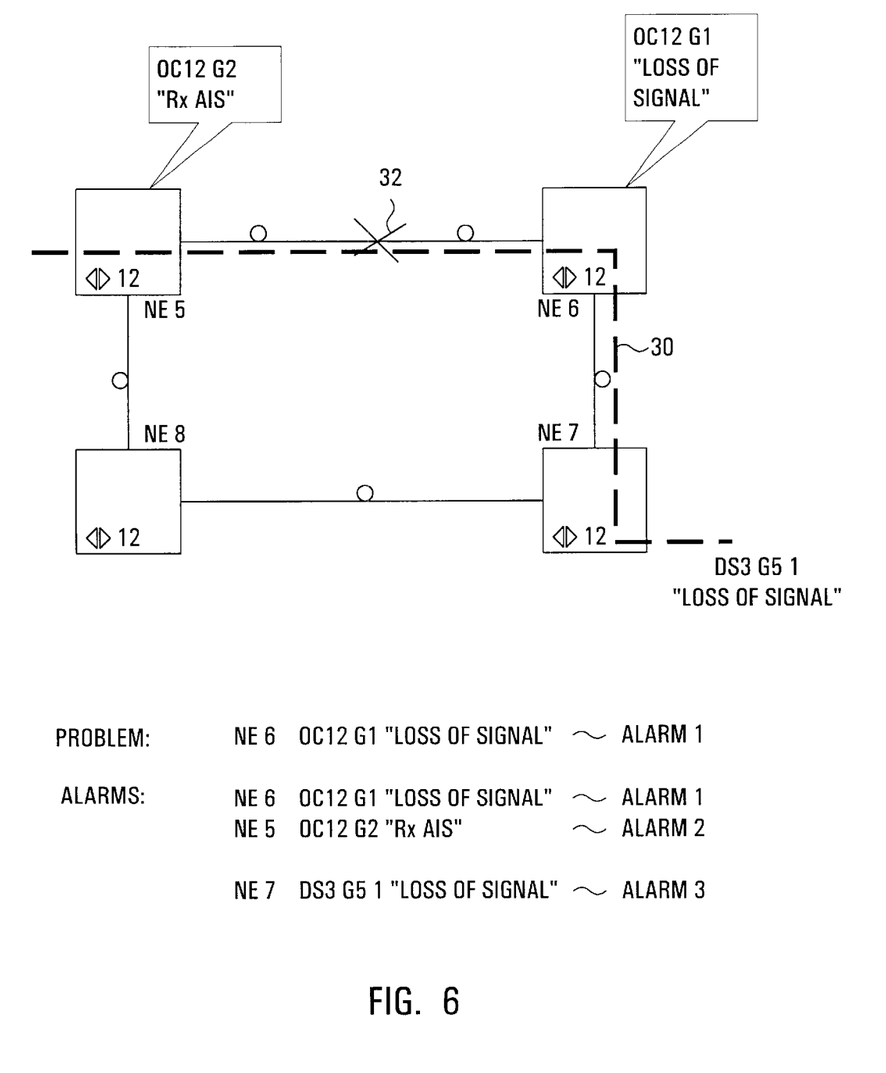
FIG. 6 is a graphical view of an example network in an alarm scenario.

To further clarify the above described correlation model consider the example illustrated in FIG. 6. FIG. 6 shows a SONET ring composed of four network elements labelled NE 5, NE 6, NE 7, and NE 8 respectively. Suppose a path layer DS3 signal is added at NE 5 and dropped at NE 7 as indicated by the dashed line 30. Suppose there is fiber cut between the NE 5 and NE 6 as depicted by the "X" 32. Some of the alarms which are typically raised on the NEs are shown in the Figure. NE 6 has raised an OC12 alarm entitled OC12G1 "Loss of Signal". NE 5 has raised an OC12 alarm entitled OC12G2 "RxAIS", and NE 7 has raised a DS3 alarm entitled DS3G51 "Loss of Signal". The two OC12 alarms are at the line layer and the DS3 alarm is at the path layer. The new alarm correlation algorithm will be described by way of example for this network.

Figure 7:
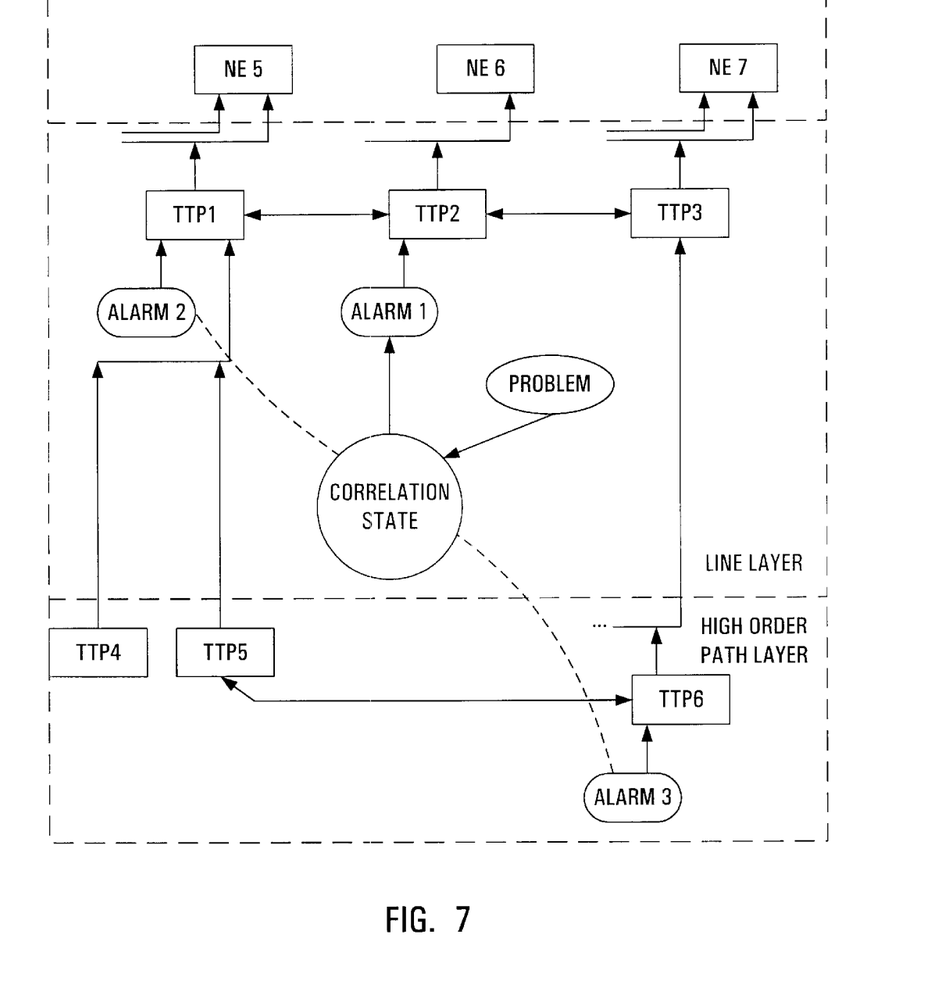
FIG. 7 is a hierarchical network model for the network of FIG. 6.

The network of FIG. 6 is represented by the alarm correlator as a hierarchical network model shown in FIG. 7. Irrelevant links and objects are not shown in the figure for the sake of clarity and simplification.

At the network element layer there are three TTP's labelled NE 5, NE 6, and NE 7. At the line layer there are three TTP's labelled TTP1, TTP2, and TTP3. The connections between these TTP's represent the OC12 connections between the network elements. In the high order path layer there are three TTP's labelled TTP4, TTP5 and TTP6. TTP5 and TTP6 are the TTPs for the DS3 connection between NE 5 and NE 7 which is a higher order path connection. The three alarms identified above are illustrated in the FIG. 7 view in three alarm bubbles labelled "Alarm1", "Alarm2", and "Alarm3" attached to TTP2, TTP1 and TTP6 respectively. The correlation state object and the problem to which it points are also indicated in bubbles.

In FIG. 7 suppose Alarm1 on TTP2 of NE6 is a root-cause alarm which can be correlated to Alarm2 on TTP1 of NE5 and Alarm3 on the path layer TTP1 of NE7. Once Alarm1 is raised, it is posted to the inference engine by TTP2. The inference engine determines that it is a root-cause alarm, creates a problem object and generates a correlation state on that TTP and passes the correlation state back to the TTP for traversal. The TTP2 then sets the Current TTP field of the correlation state to OriginalTTP and also sets the Impact to "internal" and posts the correlation state to the inference engine. The inference engine examines the StateText and other attributes of the correlation states and fills out the expected alarms list of the correlation state for that TTP and returns the correlation state to TTP2. TTP2 in this example finds no other alarm on itself that can be correlated. TTP2 then passes the correlation state to TTP1 on NE5 because it is in its impact group at the same layer. This TTP in turn sets the CurrentTTP attribute of the Correlation State and its Impact attribute to external, and posts the correlation state to the engine. The engine then determines the expected alarms on the TTP of NE5 (based on the current correlation state attributes). In this example an alarm of the same type as Alarm2 is in the ExpectedAlarmList. TTP1 compares its alarms to the ExpectedAlarmList and discovers this fact. Consequently Alarm2 is added to the problem object as a symptomatic alarm.

The correlation state is then sent to the lower layer TTPs for further correlation. The lower layer TTPs which are first examined are TTP4 and TTP5 which are direct clients of TTP1 of NE5. Then all the TTPs in their impact group are examined which include TTP6 of NE7.

Alarm3 on this TTP can be correlated to the problem and therefore it is added to the problem object. After the circulation of the correlation state is complete the generated problem object on TTP2 of NE6 (the originalTTP) is reported. In the circulation process described above every time the Expected Alarm List on a traversed TTP is not empty, a pointer will be established between the TTP and the correlation state. Therefore when an expected alarm arrives later, it will be added to be respective problem immediately.

Preferably, the system is capable of determining probable problems for an alarm if it can not be correlated to a root-cause alarm.

INFERENCE ENGINE

The inference engine processes alarms posted by TTPs. As alarms enter the engine for correlation, various rules are applied in determining how the alarm is processed, and these alarms are preferably arranged in rule sets, with specific rule sets applied to alarms satisfying particular criteria. For example, there might be a different rule set for each network element type which is used in processing alarms generated by network elements of that type. This particular approach makes it easier to introduce new network element types.

The inference engine is a software program which preferably examines the rules and executes a rule if it is applicable. The rules may for example be if then clauses that embed the knowledge about the equipment and alarms. These rules should be written by experts who know the equipment and alarms, and can associate an alarm with a root-cause alarm. In other words, all the knowledge required for alarm correlation is embedded in the rules which are written by equipment experts.

In a preferred embodiment, alarm postings are processed according to two basic patterns. The first pattern of rules are considered the "equipment alarm" rule sets. If the alarm is a root-cause alarm, it's alarm reason is examined and the state of the affected TTP is determined. A correlation state will be created by the rules and placed on the TTP which raised the alarm. The creation of a correlation state will also start the second pattern of rule sets. If the alarm is a symptomatic alarm, rules will fire to continue the second pattern of rule sets.

The second pattern of rules are considered the "equipment state" rule sets. These rules act upon the states at the TTPs that are generated by the engine during the first pattern of rule sets. The correlation state rules fire corresponding to the correlation state object's type and they act upon the Correlation manager's model to generate problems in the network.

Alarm clear events are also forwarded to the engine. The clear events are not queued but act upon the correlation model immediately by removing alarm events and updating the correlations status of the correlation states located in the engine.

RULE SETS

Figure 8:
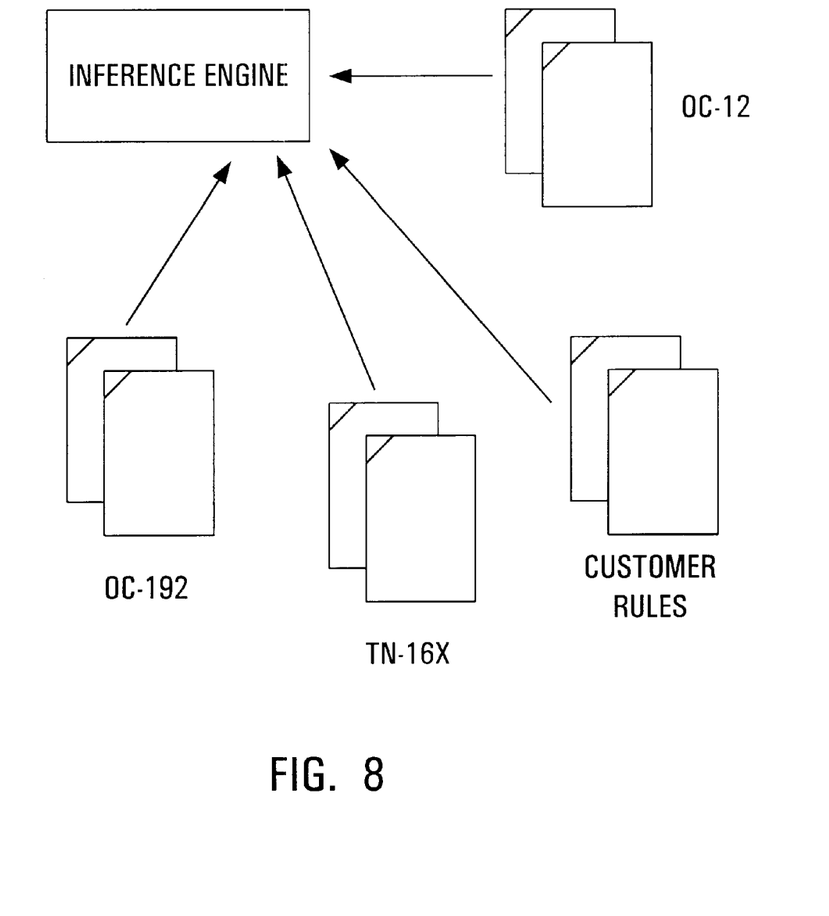
FIG. 8 is an illustration of various rule sets which can be applied by the inference engine of FIG. 2.

Preferably, the alarm correlator 10 allows for the separation of the rule sets into specific network element type rule sets as shown in FIG. 8 where separate rule sets for OC-12, OC-192, and TN-16X are illustrated. This separation provides easier manageability of the rule sets and allows for delivery of rule sets independent the alarm correlator's operation:

1. As customers order new equipment software releases for a given network element, only the respective rule set needs to be updated and delivered to reflect changes in the network element's software.
2. As new equipment components are delivered (e.g., new card types), only the rules for the equipment need to be updated and delivered to reflect the changes. There would be no need to update the entire inference engine.
3. Customer Defined Rules could be isolated to a separate rule set that would not interfere with the operation of the "delivered" rule sets.

4. As new Network Elements are delivered, the rules for these Network Elements could be delivered as a separate package.

Numerous modifications and variations of the present invention are possible in light of the above teachings. It is therefore to be understood that within the scope of the appended claims, the invention may be practised otherwise than as specifically described herein.

For example, the above examples have focussed on alarm correlation for correlating network alarms. In another embodiment, a similar approach may be used to correlate events of a more general nature in any system which can be modelled using a hierarchical connectivity model of model elements. In this case each event would have a corresponding event indicator which might be a root event indicator depending upon root event criteria.

We claim:

1. A method for correlating event indicators relating to a system comprising:
   defining a model of the system comprising a plurality of model elements;
   after receiving an event indicator;
      associating the event indicator with one of said plurality of model elements;
      determining if the event indicator is a root event indicator by consulting root event criteria;
      if the event indicator is a root event indicator then determining an impact group of model elements for the root event indicator and determining for each model element in the impact group whether one or more previous event indicators associated with the particular model element are correlatable to the root event indicator, and if so correlating the one or more event indicators to the root event indicator;
      if the event indicator is not a root event indicator, determining whether the event indicator is correlatable with a previously determined root event indicator.

2. A method according to claim 1 farther comprising:
   if the event indicator is a root event indicator, establishing a relation between one or more of the model elements in the impact group of the root event indicator and the root event indicator;
   if the event indicator is not a root event indicator determining whether the event indicator is correlatable with a previously determined root even indicator to which a relation has been established for the model element associated with the event indicator.

3. A method according to claim 1 further comprising:
   defining said model as a hierarchical system model such that each model element depends from another specific model element thereby forming a set of model layers;
   maintaining a connectivity model consisting of, for each model layer a respective plurality of direct relations between pairs of model elements in the hierarchical system model;
   determining the impact group of a root event indicator from the hierarchical system model and from the connectivity model.

4. A method according to claim 3 for modelling a system comprising system components capable of terminating one or more hierarchies of connections wherein:
   a model element in said model is defined for each system component and a model element is defined for each termination of a connection of one of said hierarchies of connections;
   maintaining said connectivity model comprises identifying relations between pairs of model elements which represent two endpoints of a given connection.

5. A method according to claim 4 wherein the impact group comprises:
   (a) all model elements with relations to the root event indicator's associated model element in the same model layer;
   (b) all model elements in layers below the model layer of the root event indicator's associated model element which depend directly or indirectly from the root event indicator's associated model element;
   (c) all model elements with relations to model elements identified in b).

6. A method according to claim 1 wherein each event indicator is an alarm, or information identifying an alarm.

7. A method according to claim 1 further comprising:
   identifying on the basis of a previously determined root event indicator one or more expected event indicators;
   wherein the step of determining whether the event indicator is correlatable with a previously determined root event indicator comprises comparing the event indicator with said one or more expected event indicators.

8. A method according to claim 1 further comprising:
   for each model element in the impact group, identifying on the basis of a previously determined root event indicator one or more expected event indicators;
   wherein the step of determining whether the event indicator is correlatable with a previously determined root event indicator comprises comparing the event indicator with said one or more expected event indicators for the model element associated with the event indicator.

9. A method according to claim 4 further comprising:
   for each model element in the impact group, identifying on the basis of a previously determined root event indicator one or more expected event indicators;
   wherein the step of determining whether the event indicator is correlatable with a previously determined root event indicator comprises comparing the event indicator with said one or more expected event indicators for the model element associated with the event indicator.

10. A method according to claim 9 wherein each event indicator is an alarm, or information identifying an alarm, and wherein each model element is a transport termination point in a communications network.

11. A method according to claim 1 further comprising the step of outputting the root event indicator and all event indicators which have been correlated to the root event indicator.

12. A network management device for managing a network of network elements which generate alarms, the network management device comprising:
   an input for receiving alarms from the network;
   an alarm correlator for maintaining a hierarchical connectivity model of the network comprising a plurality of model elements and connections between model elements, for associating each received alarm with one of the plurality of model elements in said hierarchical connectivity model, and for correlating a first alarm associated with a first model element in said hierarchical connectivity model with alarms associated with model elements in an impact group of model elements for said first model element;
   wherein each model element is a transport termination point, and said hierarchical network model comprises a hierarchical model of each network element in the network having a transport termination point for each connection terminated by the network element, the transport termination points being organized hierarchically with each termination point of a lower layer connection being served by a termination point of a hither layer connection, and said hierarchical network model further comprising a connectivity model of the network in which connections in the network are modelled as connections between pairs of transport termination points in the hierarchical network model;

wherein said impact group of model elements comprises all model elements directly connected to the first model element in the same layer, and all model elements in layers below the first model element which depend directly or indirectly upon the first model element and all model elements directly connected to any such model elements.

13. A network management device according to claim 12 wherein said first alarm is a root-cause alarm, the device further comprising:

a root-cause determiner for determining if an alarm is a root-cause alarm or a symptomatic alarm.

14. A network management device according to claim 13 wherein upon identification of a root-cause alarm, a correlation state is created by the alarm correlator, and the correlation state is used to examine all transport termination points in the root-cause alarm's impact group for symptomatic alarms.

15. A network management device according to claim 14 wherein the correlation state establishes a link between transport termination points in the impact group and the root-cause alarm such that later symptomatic alarms on the transport termination points in the impact group can be quickly correlated with the root-cause alarm.

16. A network management device according to claim 15 wherein said alarm correlator identifies a list of expected alarm for each transport termination point in the impact group, and during said examination of the transport termination points in the impact group leaves a link between the root-cause alarm and the expected alarms in said list which were not found during said examination.

17. A network management device according to claim 16 further comprising one or more rule sets defining how the impact group is determined and defining how alarms are correlated.

18. A network management device according to claim 12 wherein said hierarchical connectivity model is dynamically maintained.

* * * * *

UNITED STATES PATENT AND TRADEMARK OFFICE
CERTIFICATE OF CORRECTION

PATENT NO. : 6,707,795 B1
DATED : March 16, 2004
INVENTOR(S) : Majid Noorhosseini et al.

It is certified that error appears in the above-identified patent and that said Letters Patent is hereby corrected as shown below:

Column 4,
Line 52, "...Ad..." should be deleted.

Column 6,
Table 3, please delete "..L7, L8, L9" from row H9.

Signed and Sealed this

Thirty-first Day of August, 2004

JON W. DUDAS
*Director of the United States Patent and Trademark Office*